April 16, 1963 W. R. JOHNSON 3,086,087

TRANSDUCER FOR MAGNETICALLY RECORDED SIGNALS

Filed May 5, 1958 3 Sheets-Sheet 1

INVENTOR.
WAYNE R. JOHNSON

BY

Lippincott, Smith & Ralls
ATTORNEYS

TRANSDUCER FOR MAGNETICALLY RECORDED SIGNALS

Filed May 5, 1958 3 Sheets-Sheet 2

INVENTOR.
WAYNE R. JOHNSON
BY
Lippincott, Smith & Ralls
ATTORNEYS

April 16, 1963 W. R. JOHNSON 3,086,087

TRANSDUCER FOR MAGNETICALLY RECORDED SIGNALS

Filed May 5, 1958 3 Sheets-Sheet 3

INVENTOR:
Wayne R. Johnson
By Smyth, Roston & Pavitt
Attorneys.

United States Patent Office 3,086,087

Patented Apr. 16, 1963

3,086,087
TRANSDUCER FOR MAGNETICALLY RECORDED SIGNALS

Wayne R. Johnson, Los Angeles, Calif., assignor to Minnesota Mining and Manufacturing Company, St. Paul, Minn., a corporation of Delaware Filed May 5, 1958, Ser. No. 733,045
12 Claims. (Cl. 179—100.2)

This invention relates to transducer heads as employed for the recording of electrical signals on, or reproduction from moving magnetic media and particularly (although not exclusively) to the recording of signals occupying a very wide frequency spectrum, either by dividing those signals into a plurality of narrower channels, recorded by multiple parallel tracks on the medium, or by recording such signals on tracks extending transversely of a recording tape by means of a virtual gap scanning the tape laterally, the virtual gap being formed by an elastic wave traversing the recording head, as described in my copending application Serial No. 733,165, filed on May 5, 1958, now Patent No. 3,053,941.

The transducer heads most generally employed at present for magnetic recording and reproduction comprise a ferromagnetic core forming an almost complete magnetic loop which is interrupted by at least one nonmagnetic gap over which the tape is passed, the lines of force of the magnetic field leaving the core on one side of the gap to enter the magnetic coating on which the recording is made and re-entering it on the far side of the gap, thus effecting the magnetization of the medium. Characteristically, the magnetic core may be considered as a toroid having a radial slot therein that constitutes the gap. Practically, for constructional reasons, the core is usually formed in two halves, each bearing a portion of the winding, which are brought together to form the substantially complete magnetic loop.

Where the signals to be recorded are divided between a number of tracks, the assembly of such heads into a multiple head wherein the gaps are exactly alined becomes a difficult problem. The gaps used are of the order of magnitude of 0.1 mil. At the highest frequencies to be recorded by each gap, a misalinement between the gaps in the various heads by as little as 0.1 mil can result in the reproduced signals being out of phase by 180 degrees or more. It is therefore obvious that the assembly of such multiple heads is a matter requiring the highest degree of precision and their manufacture is accordingly expensive.

In the other form of broad band recording mentioned, where a virtual gap is formed by a traveling elastic wave, the most critical and difficult factor in the construction of the recording heads is the disposing thereon of the winding that carries the signal. In this case the recording head takes the form of a tube of magnetostrictive material which is normally so stressed as to make its circumferential permeability approach unity while its longitudinal permeability is high. The winding is disposed upon the tube in such manner as to develop a circumferential magnetic field when current is passed through it. Means are provided at one end of the tube for initiating in it an elastic wave of opposite sign to the initial stress. The tube thus becomes an acoustic transmission line, down which the wave is propagated and the particular area where the presence of the wave reverses the stress is the only one where the circumferential permeability is high. Successive waves are initiated at intervals equal to or slightly less than the time required for the wave to propagate the length of the tube. In one sense the tube is thus the equivalent of the toroid mentioned as typifying the usual type of transducer head, but the toroid is stretched out greatly in the direction of its principal axis. The winding is similarly stretched out, taking the form of a single turn in the embodiment originally conceived.

Among the objects of the present invention are to provide an arrangement for exciting the circumferential fields in a transducer head that results in a head of extreme simplicity, that is applicable either to the construction of multiple heads or to the traveling-wave type of head just described, that avoids the difficulties inherent in the manufacture of multiple heads of conventional form, assuring alinement of the gaps and particularly preventing irregular offsetting as between the various gaps, and that can also be applied to single track transducers.

In accordance with the present invention, the head comprises a cylinder of ferromagnetic material having a nonmagnetic gap in its periphery extending parallel to its axis. "Cylinder" is here used in its general sense, since it need not necessarily be circular although a circular cylinder is generally the most convenient. In its preferred form the cylinder is hollow; i.e., it is a tube with the gap extending through the wall. One of the most convenient methods of manufacture is to form the tube of a high permeability magnetic sheet or tape, rolled into tubular form and with the edges abutted and copper brazed to form the gap. Other structures are possible, however; the cylinder may be formed of two hemi-cylinders brazed or cemented together or it may be a solid rod slotted down one side, preferably to the center, although this does not permit the very narrow gaps required in the services for which the invention is most useful. The cylinder as thus described is the acoustic transmission line in the case of a traveling, virtual gap; if the device is to be used as the foundation of a multiple head structure it is made long enough to encompass the entire number of heads that are required, with suitable guard bands between them. A conductive loop is connected to the cylinder at points spaced along it axially by the distance of the width of the desired track upon the recording medium, "width" as here used meaning the dimension of the track normal to the motion of the medium. In the case of the elastic-wave type of head the loop connects to the two ends of the cylinder; in the case of multiple heads a plurality of such loops are used, each loop connecting to the cylinder at two points separated by the track width. Each of the conductive loops is coupled to an external signal circuit. The most effective method of so coupling the loop is by the use of a toroidal ferromagnetic core which carries a toroidal winding forming part of such external circuit, the loop being threaded through the core. A substantial equivalent is a rectangular "window" core with the external winding carried by its legs.

With this arrangement the conductive loop, together with a portion of the cylinder between the connections thereto becomes, when the head is used for recording, a single turn secondary winding for the toroidal or equivalent transformer or, on playback, a single turn primary. The cylinder itself exercises a double function; it is both the head winding and a ferromagnetic core wherein the flux through which the transduction of the signal is accomplished is induced.

It may not be apparent that this arrangement would be effective to produce a flux across the gap that would result in a recording or, in playback, that a flux across the gap would induce the desired current in the loop circuits. Upon consideration it will be seen, however, that the existence of the skin effect which prevents either high-frequency currents or high frequency fluxes from penetrating deeply is dependent on fluxes that must be effective across the gap.

Experiment has proved that heads thus formed and excited are equally as effective as those of conventional types. The impedance of the head circuit itself is very low. The use of the transformer coupling through the conductive loops, however, permits accurate impedance matching.

The detailed descriptions of certain embodiments of the present invention which follow are illustrated by the accompanying drawing wherein.

Figure 2:
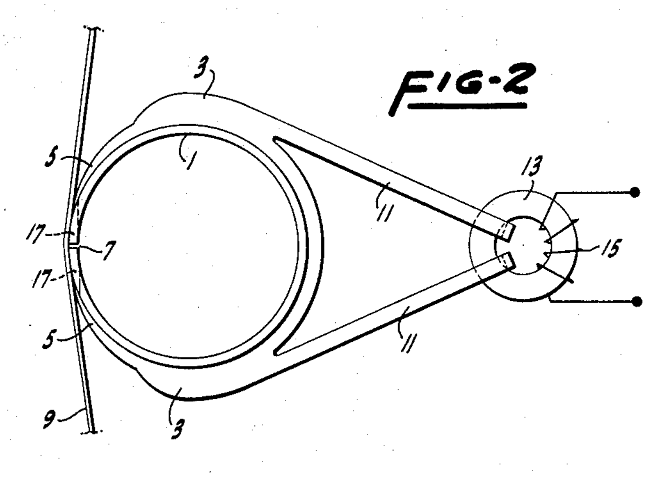
FIG. 2 is an end view of the head illustrated in FIG. 1.
Figure 1:
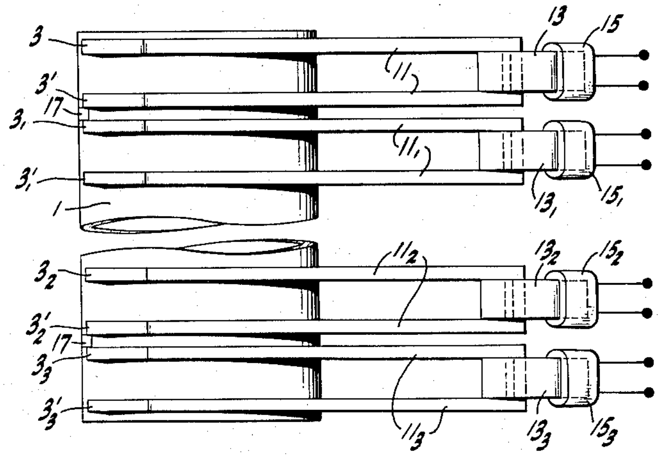
FIG. 1 is an elevation of a multiple head constructed in accordance with the present invention, the connections to the head being illustrated schematically.
Figures 6, 7:
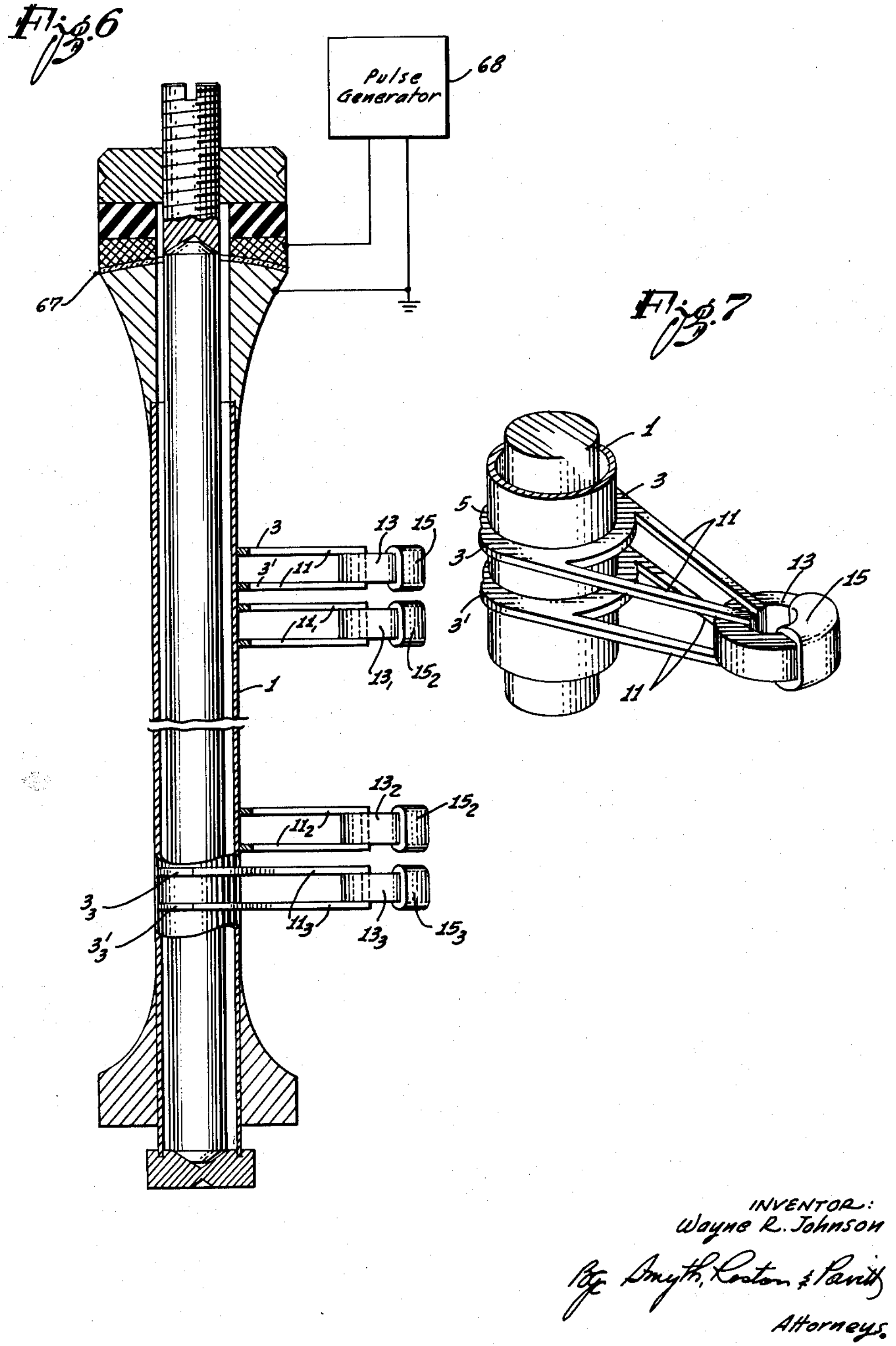
FIG. 6 is an elevation, in section of a head of the type illustrated in FIGS. 1 and 2.
FIG. 7 is a pictorial view of part of the head illustrated in FIGS. 1 and 2.

Considering first the invention as applied to a multiple head, a preferred form is illustrated in FIGS. 1, 2 and 7. In this embodiment of the invention the cylinder 1, which forms the head proper, is constructed of two semi-cylinders of high-permeability conducting magnetic material, such, for example, as those sold under the trade name of "Alfenel," "Mu metal" or "Permalloy." In the head illustrated Alfenel was used, the sheet material being formed into a semi-cylindrical or semi-tubular shape, with the edges ground and lapped to substantially optical flatness so that the two halves meet exactly. Surrounding the tube at intervals are coupling rings 3, 3′, $\mathbf{3_1}$, $\mathbf{3_1'}$, etc. The form of these rings is so chosen as to distribute the current flow to the conductive material of the head as uniformly as possible. The rings do not completely encircle the tube, being somewhat in the form of a highly exaggerated crescent, the cusps 5, whereof, are spaced slightly on either side of the recording gap 7 where the two halves of the magnet cylinder join, these cusps being tapered so that the recording tape 9 can traverse the head without contact with the conducting ring. The rings hold the two halves of the cylinder together, being either force-fitted over the cylinder or being soldered or brazed thereto, as by hydrogen-copper brazing. In order further to assure uniform current distribution connection to each of the rings 3, 3′, etc. is made through a pair of parallel conductive loops 11, one of which connects to each side of each connecting ring.

Both conducting loops pass through and link with a core 13 of a toroidal transformer carrying a winding 15 for connection to an external circuit. It will be seen that the two conductive loops 11 connect to the rings 3, 3′, are effectively in parallel and thus, together, constitute only a single turn winding when connected by the short section of the cylinder 1 between the proximate edges of the connecting rings 3, 3′. These edges are separated by the desired width of the track to be traced by the completed head.

Succeeding tracks are formed by similar arrangements, the parts whereof are indicated in the drawing by the same reference characters as are applied to those associated with the first tracks, distinguished by subscripts. Adjacent connecting rings for successive tracks are separated by a sufficient distance to form a guard band between tracks of sufficient width to prevent cross-talk. This is shown by the spacing between the adjacent connecting rings 3′ and $\mathbf{3_1}$; a similar spacing separates successive tracks. The cylinder 1 can be made of any desired length to accommodate as many tracks as may be required.

It has been found that cross-talk between successive tracks is of the same order of magnitude as with conventional heads, separated by a like distance. Cross-talk can be further reduced, however, by inserting a shield 17 of high permeability material in the space between adjacent connecting rings to different tracks. One way of inserting such a shield is to grind a flat spot across the gap between the adjacent rings and inlay a segment of, say, Mu metal, across the gap, so that the junction between the Mu metal and the body of the cylinder is outside of the area contacted by the tape 9 in traversing the head. After the insertion of the Mu metal shield the area contacting the tape is lapped smooth to conform with the circumference of the cylinder.

The construction thus described is that leading to the greatest precision but it is considerably more elaborate than is really necessary. Excellent results have been obtained by merely soldering the ends of a single-wire conductive loop to the cylinder so as to contact both its halves.

Figure 3:
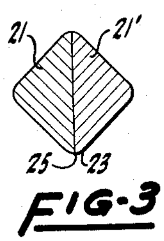
FIGS. 3 and 4 are cross-sectional views through cylinders comprised in the head, illustrating alternative constructions that may be employed.
Figure 4:
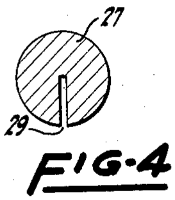

The cylinder shown in FIGS. 1, 2, 6 and 7 is hollow and circular but neither of these is a necessary characteristic. In order to prevent undue wear upon the tape or other recording medium the surface that contacts the tape should be curved and therefore this portion at least of the head meets the geometrical definition of a cylinder. FIGS. 3 and 4 illustrate cross-sections of other types of construction that may be employed to form the heads. In the form shown in FIG. 3, the cross-section of the head as a whole is very nearly that of a square, split on a diagonal into the two halves 21 and 21′, the only portion that is necessarily curvilinear being the surface 23 where the two halves come together to form a cylindrical face over which the tape is drawn. The nonmagnetic gap formed by the junction 25 can be filled with a thin film of copper, silver solder or other brazing material, or the two halves may be cemented together with a nonconducting material such as an epoxy resin. The latter construction requires that care be taken to see that the connections on each side of any one of the recording gaps contact both halves of the structure. Instead of being approximately triangular in cross-section the two parts 21 and 21′ can, of course, be semi-circular, which is far the most practical form, or they can have almost any other cross-section as long as the cylindrical surface is formed at the gap.

Another possible form for the body of the head is illustrated in FIG. 4. In this case the head is formed of a single solid rod 27 having a slot 29 milled partway through it longitudinally. The principal disadvantage of this structure is that the resultant slot has a material width, much greater than that normally desired as a recording gap in present day practice.

Figure 5:
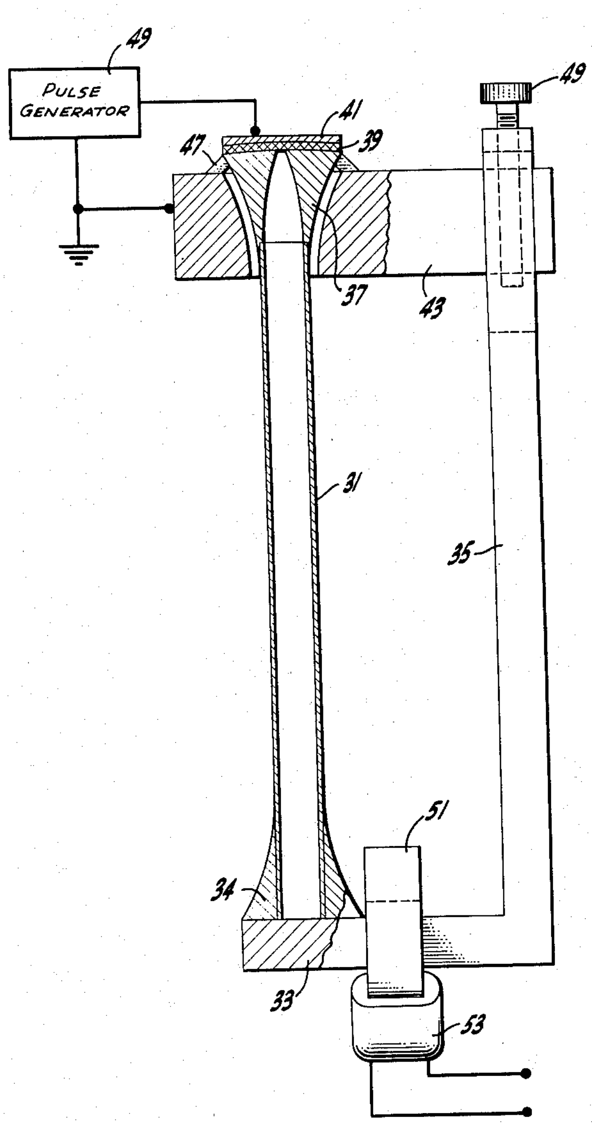
FIG. 5 is an elevation, partly in section, of a transducer head employing the traveling elastic-wave principle and embodying the present invention, together with a mounting which also constitutes the conductive loop circuit for the head.

FIG. 5 illustrates the application of the invention to a transducer head of the type described and claimed in my copending application Serial No. 733,165, above referred. to. In this embodiment of the invention the head proper is a two-part tube 31 of magnetostrictive material, formed as shown in FIG. 1 and having its two halves hard-soldered or cemented together. At the lower end, as illustrated, the tube 31 is soldered to a transverse arm 33 that extends outwardly from a vertical support post 35. The lower end of the tube 31 is surrounded by a conical section 34 of material adapted to absorb elastic waves transmitted along the tube. This may be of lead, soldered to the tube or of semi-soft rubber vulcanized to it, as has been explained in the prior application before mentioned. The upper end of the tube 31 connects to an impedance-matching section 37, of non-magnetic material such as stainless steel, which has a characteristic acoustic impedance substantially equal to that of the tube 31. This section is tapered in cross-section, preferably on an exponential curve so that when the head is placed in tension the unit stress increases gradually from the end of the impedance-matching section down to the tube that forms the head proper. A thin piezoelectric crystal, 39, preferably of barium titanate, surmounts the impedance-matching section 34; this is backed by a steel disc 41, in this instance about 10 mils in thickness, the thickness being one-half wavelength in the steel of the pulses used to transmit the elastic wave down the head.

The support post 35 carries a transverse arm 43 that is movable along the post, its position being adjustable by means of a tension screw 59. An opening through the arm 43 conforms generally to the form of the matching section 37 so that the latter passes through the arm with a slight clearance on all sides. A dished washer 47 bears against both the arm 43 and the rim of the matching section, at its point of maximum diameter, the outer edge of the washer bearing on the arm 43 and circling the rim of the opening therethrough while the inner periphery of the washer supports the rim of the matching section.

A pulse generator 49 connects to arm 43 and ground on the one side of the crystal and steel back up disc 41 on the other side. In the present instance this generator develops one-tenth microsecond pulses which are applied to the crystal 39 in such sense as to cause it to tend to expand, initiating a compression wave that travels down the normally tensioned head.

As thus far described, the head is very similar to that disclosed in the copending application Serial No. 733,165 above cited. The real difference resides in the signal circuit which comprises the conductive loop formed by the lower bracket arm 33, support post 35, upper transverse adjustable bracket arm 43, the washer 47, and the head itself back to the lower arm 33. This loop circuit is coupled to an external signal circuit by means of a ferromagnetic core 51 which can encircle any portion of the loop circuit and which carries a winding 53 for connection to the recording or playback amplifiers as the case may be.

In operation, the adjusting screw 59 is tightened so as to tension the entire head to a point where the circumferential permeability in the tube 31 is reduced substantially to unity. The tape engages the head over the major portion of its length between the end of the tapered matching section 37 and the tapered absorbing section 34. In the head illustrated this distance is about two inches. The pulse generator develops steep wavefront pulses of about one-tenth microsecond duration with a repetition frequency that is a little less than the propagation time of the waves from edge to edge of the tape; for a two inch wide tape the repetition frequency is about 94.5 kilocycles per second. Preferably the pulses are of sufficient amplitude to reverse the direction of the stress in the tube at the point which they are passing. Where the pulse does reverse the stress the circumferential permeability of the tube 31 rises to a relatively high value while its longitudinal permeability in this area becomes low. Longitudinal currents through the head develop a circumferential flux in it in the same manner as with the recording gaps in FIGS. 1 and 2. Each pulse wave traveling along the length of the head therefore forms a virtual gap that scans laterally across the tape while the latter is being progressed substantially at right angles to the direction of scanning. It is possible, if desired, to increase the conductivity of the head by plating it externally with either copper or silver. This is not necessary; it works nearly equally as well with all of the current carried by the material used for the core itself. The structure therefore leads to head designs that can be manufactured very cheaply in view of their precision.

FIG. 6 illustrates the head similar to that disclosed in the application Serial No. 733,165 with the multiple loops 11, 11', etc. coupled thereto. The pulses generated by the crystal 67 pass through the tube 1. The generator 68 is utilized to energize the crystal 67.

The two designs that have been shown in detail and the various modifications of these designs that have been referred to briefly, are only a few of the many possible embodiments of the invention. In confining the description to these designs no limitation on the scope of invention is intended other than that expressed directly in the claims that follow.

I claim:

1. A transducer head for providing a transducing action with a magnetic medium movable in a first direction, including, a hollow cylinder of conductive ferromagnetic material disposed in a second direction transverse to the first direction and having a non-magnetic gap which is substantially parallel to the axis of the cylinder and in contiguous relationship to the medium for a passage of flux in an annular direction around the cylinder and in the first direction across the gap and for a linkage of flux between the medium and the cylinder, and
   a signal circuit comprising a portion of a conductive loop and a portion of the cylinder, the conductive loop being electrically connected directly to said cylinder at points spaced axially therealong for a passage of current in the axial direction through the cylinder and a transducing action between the passage of current in the axial direction through the cylinder and the passage of flux in the first direction through the gap.

2. A transducer head circuit as defined in claim 1 wherein an external circuit is included and wherein means couple said signal circuit and said external circuit and wherein said coupling includes a ferromagnetic core forming a closed magnetic-loop circuit and further includes a winding disposed on said core to establish a magnetic field therein, said magnetic-loop circuit encircling a portion of said conductive loop.

3. A transducer head circuit as defined in claim 2 wherein the ferromagnetic core is toroidal and wherein the winding on said core is toroidal and has terminals for connection to said external circuit, said conductive loop being threaded through the central opening of said toroidal core to be coupled thereby with said toroidal winding.

4. A transducer head circuit for providing a transducing action with a magnetic medium movable in a first direction, including,
   a tube made from a conductive ferromagnetic material and disposed in contiguous relationship to the magnetic medium in a second direction substantially perpendicular to the first direction and having a non-magnetic gap substantially parallel to the tube axis at a position adjacent to the medium to obtain a linkage of flux in the first direction between the medium and the tube across the gap in the medium, and
   a signal circuit including a conductor having two terminals electrically connected directly to said tube at two points spaced axially therealong at positions on the tube displaced from the gap so that the portion of said tube between the two points completes a conductive loop through said conductor and through the tube in the second direction to provide a transducing action between the flow of current through the tube in the second direction and the flow of flux across the gap in the first direction.

5. A multiple transducer head for providing a transducing action with a magnetic medium movable in a first direction where information is recorded on the medium in a plurality of tracks each displaced from adjacent tracks in a second direction transverse to the first direction and where each track is separated from the adjacent tracks by a guard band, including,
   a tube made from a conductive ferromagnetic material disposed in a second direction transverse to the first direction and having an outer wall having a non-magnetic gap through the wall with the gap extending substantially parallel to the axis of said tube in the second direction at a position contiguous to the medium to obtain a passage of flux in the first direction through the gap and a linkage of flux between the tube and the medium through the flux in the gap, and
   a plurality of conductive loops each having a pair of terminals electrically connected to said tube at positions displaced from the gap in the tube and at positions spaced axially along the tube in the second direction by a distance substantially equal to the desired width of each track in the second direction to obtain a flow of current in the second direction and a transducing action between the flow of current in the second direction through the tube and the flow of flux in the first direction through the gap, the connections to said tube by the terminals for each conductive loop being spaced by the desired width of the guard band between the tracks adjacent to the track associated with each such loop.

6. The combination defined in claim 5 wherein a plurality of external circuit means are provided and wherein a plurality of coupling means are provided and wherein each coupling means couple each individual conductive loop to a different external circuit means and wherein each coupling means includes a closed ferromagnetic core having a winding on the core for connection to one of said external circuits and wherein each of said loops is threaded through its associated ferromagnetic core.

7. A transducer head for magnetically recording and reproducing information on a magnetic medium movable in a first direction, including, a conductive ferromagnetic member positioned adjacent the magnetic medium and provided with a longitudinal axis in a second direction transverse to the first direction and provided with a configuration to obtain a flow of flux through the member in the first direction and a linkage of flux between the member and the medium upon an enabling of the member, first means coupled to said ferromagnetic member for providing in said member an enabling wave travelling along the member in the transverse direction to enable the member at successive positions in the transverse direction, second means including conductive members electrically connected to said conductive ferromagnetic member at opposite ends of said longitudinal axis to obtain a flow of current through the ferromagnetic member in the second direction and to obtain a flow of flux in the first direction through the member at the enabled position of the member in accordance with the flow of current through the member, and means coupled to said conductive members of said second means for introducing to said conductive members a recording current representing the particular information to be recorded through said conductive members and through said conductive ferromagnetic member.

8. In a recording system for transferring information to or from a member movable in a first direction, a normally disabled transducing member positioned adjacent the movable member in a second direction transverse to the first direction and made from a material to obtain the production of flux in the member in the first direction, means coupled to said transducing member for establishing in said device an enabling wave travelling in the transverse direction for an enabling of the transducing member at successive positions along the transducing member in the transverse direction, and means operatively coupled to the transducing member for effecting the transfer of information between the movable member and said transducing member at the successive positions of the enabling wave, said continuous transfer effecting means including current conductive members electrically connected to said transducing member at positions displaced from the gap and at spaced positions in the transverse direction for obtaining a transducing action between a passage of recording currents through said transducer member in the transverse direction and the passage of magnetic flux through the transducer member in the first direction.

9. A transducer head for the magnetic recording and reproduction of electrical signals on a medium movable in a first direction relative to the head, including, a tube of conductive magnetostrictive material having a non-magnetic gap extending longitudinally along the tube in contiguous relationship to the medium and in a direction transverse to the first direction, a piezoelectric crystal mounted at one end of said tube for generating elastic pulses therein for transmission longitudinally along said tube to enable the tube at successive positions in the transverse direction for a transducing action, two conductive members electrically connected to said tube at axially spaced positions along the longitudinal axis of said tube and displaced from the gap, and means operatively coupled to the two conductive members for generating a recording current through said conductive members and through the portion of said tube between the axially spaced positions to obtain a recording of flux on the medium in the first direction in accordance with the characteristics of the recording current.

10. A transducer head for magnetically recording and reproducing electrical signals on a magnetic medium movable in a first direction, including, a conductive ferromagnetic member having a non-magnetic gap positioned in contiguous relationship with the magnetic medium in a second direction transverse to the first direction to obtain a flow of magnetic flux across the gap in the conductive ferromagnetic member in the first direction, a conductive loop including a portion of said conductive ferromagnetic member and having a pair of conductive members electrically connected to said conductive ferromagnetic member at positions spaced in the second direction along said non-magnetic gap and displaced from said gap to obtain a flow of current through the conductive members and in the second direction through the portion of the conductive feromagnetic member between the pair of conductive members, and means coupled to said conductive members for providing a transducing action between the flow of current in the second direction through the conductive ferromagnetic member and the flow of magnetic flux in the first direction through the conductive ferromagnetic member.

11. A transducer head for magnetically recording and reproducing electrical signals on a magnetic medium movable in a first direction, including, a conductive ferromagnetic member having a non-magnetic gap positioned in contiguous relationship to the magnetic medium in a second direction transverse to the first direction for a passage of flux in the first direction across the gap to link the medium and the ferromagnetic member, and a conductive current loop including a portion of said conductive ferromagnetic member and including conductive members, the conductive members being electrically connected to said conductive ferromagnetic member at positions spaced in the second direction along said non-magnetic gap and displaced from the gap for a transducing action between a passage of current in the second direction through the ferromagnetic member and the passage of flux in the first direction through the ferromagnetic member and across the gap in the member.

12. A transducer head circuit for providing a transducing action with a magnetic medium movable in a first direction, including, a conductive ferromagnetic member having two portions mating at a first position and defining a non-magnetic gap at a second position displaced from the first position to define a tube with a non-magnetic gap, said ferromagnetic member being disposed in a second direction transverse to the first direction and with the gap extending in the second direction in contiguous relationship to the medium for a passage of flux through the gap in the first direction and a linkage of flux between the medium and the member, and a signal circuit including a portion of a conductive loop and a portion of the conductive ferromagnetic member, the conductive loop being electrically connected to said conductive ferromagnetic member at positions displaced from the gap in the tube and spaced in the second direction to include a portion of said conductive feromagnetic member in the conductive loop for the passage of current through the ferromagnetic member in the second direction and a transducing action between such passage of current and the passage of flux in the first direction through the gap, said conductive loop having rigid members for holding together said two mating portions of said ferromagnetic member.

References Cited in the file of this patent

UNITED STATES PATENTS

| | | |
|---|---|---|
| 2,838,614 | Ashby et al. | June 10, 1958 |
| 2,854,525 | Quade | Sept. 30, 1958 |
| 2,855,464 | Wiegand | Oct. 7, 1958 |
| 2,863,002 | Brower | Dec. 2, 1958 |
| 2,918,534 | Wiegand | Dec. 22, 1959 |
| 2,921,989 | Serrell | Jan. 19, 1960 |
| 2,927,163 | Brower | Mar. 1, 1960 |